United States Patent …

(12) United States Patent
Manning

(10) Patent No.: US 7,597,741 B2
(45) Date of Patent: Oct. 6, 2009

(54) METHOD OF MAKING STEEL

(75) Inventor: Christopher Manning, Mount Pleasant, SC (US)

(73) Assignee: Nucor Corporation, Charlotte, NC (US)

( * ) Notice: Subject to any disclaimer, the term of this patent is extended or adjusted under 35 U.S.C. 154(b) by 217 days.

(21) Appl. No.: 11/307,744

(22) Filed: Feb. 20, 2006

(65) Prior Publication Data

US 2007/0193412 A1    Aug. 23, 2007

(51) Int. Cl.
C22B 1/24 (2006.01)
C21C 7/076 (2006.01)
C21C 7/04 (2006.01)
C21C 5/52 (2006.01)

(52) U.S. Cl. ............................. 75/773; 75/570; 75/749

(58) Field of Classification Search ............... 75/10.46, 75/10.47, 10.53, 10.58, 303, 305, 313, 327, 75/329, 560, 570, 746, 770, 773
See application file for complete search history.

(56) References Cited

U.S. PATENT DOCUMENTS

| | | | |
|---|---|---|---|
| 2,376,998 A * | 5/1945 | Fulton | .................. 75/320 |
| 4,004,918 A | 1/1977 | Fukuoka et al. | |
| 4,491,568 A | 1/1985 | Bortnik et al. | |
| 5,186,742 A | 2/1993 | Hoffman et al. | |
| 5,397,379 A | 3/1995 | Barker et al. | |
| 5,666,638 A | 9/1997 | Bergendahl | |
| 6,102,982 A | 8/2000 | Isozaki et al. | |
| 2003/0192405 A1 | 10/2003 | McClintock | |
| 2005/0011309 A1 | 1/2005 | Wolfe | |

OTHER PUBLICATIONS

D. Schauwinhold et al. Steel: In Ullmann's Encyclopedia of Industrial Chemistry, Online Jun. 15, 2000, p. 1-68.*
J. Dahl et al. Roll-press briquetting helps Iowa producer retain previously wasted fines as valuable product, Powder Handling and Processing, vol. 13, No. 2, Dec. 24, 1993, p. 1-4 —In IDS.*
Richard Komarek, Roll-press briquetting can help lime producers improve materials handling, Mining Engineering, Dec. 24, 1993, p. 1-4 —In IDS.*
Richard Komarek, "Roll-press Briquetting can help lime producers improve materials handling," publication, p. 4, (Dec. 24, 1993).
Jeff Dahl, Dennis Jones, Richard Komarek, "Roll-Press Briquetting Helps Iowa Lime Producer Retain Previously Wasted Fines as Valuable Produce," vol. 13 ( No. 2), p. 4, (Apr. 24, 2001).
PCT/US07/62386 International Search Report, Nov. 27, 2008.
PCT/US07/62386 Written Opinion, Nov. 25, 2008.
International Preliminary Report on Patentability for PCT/US2007/062386, dated Nov. 27, 2008.

* cited by examiner

Primary Examiner—George Wyszomierski
Assistant Examiner—Mark L Shevin
(74) Attorney, Agent, or Firm—Hahn Loeser & Parks LLP; Arland T. Stein

(57) ABSTRACT

A method of making steel in an electric arc furnace is provided. The method comprises the steps of charging a steelmaking furnace with an iron source, wherein the iron source is melted and refined in the steelmaking furnace during a campaign, providing a source of lime that is screened by a first screening device, compacting the lime material adjacent to the steelmaking furnace to a predetermined size, charging the compacted lime to the steelmaking furnace within a short period of time to avoid degradation of the compacted lime, and adding additional fluxing agents and additives to the steelmaking furnace to produce refined steel in the campaign.

26 Claims, 5 Drawing Sheets

METHOD OF MAKING STEEL

BACKGROUND AND SUMMARY OF THE INVENTION

This invention relates to making steel and particularly the use of dolomite lime in making steel. Lime is a well known ingredient to be one of the additives in making steel. It is typically used in making steel by an electric arc furnace ("EAF"), basic oxygen furnace ("BOF"), bottom blow oxygen furnace ("Q-BOP"), and even in ladle metallurgy furnaces ("LMF").

In a typical operation of an EAF, solid charge ingredients including raw scrap, limestone, burnt lime, iron ore and ferroalloy additives are charged to a furnace. Several handling schemes have been developed for the introduction of dolomitic lime, hical lime and other flux materials into the furnace. These schemes include pneumatic injection, batch loading with mobile equipment, and various forms of top feed. These top feed systems, also called "top charge" units, include that are partially or completely automated and continuously or semi-continuously deliver flux, alloy, and/or carbonaceous materials and introduce the material in the roof or sidewall of the furnace. Such furnaces may be equipped with a roof swing which swings the roof aside when cold scrap is charged; a rocker/rail tilting arrangement which allows the furnace to tilt forward for tapping and backward for slagging; an injection system for supplying additions through the furnace roof; and evacuation system for removing dust generated during the steel-making procedure.

In an EAF, electrodes are typically supported overhead and project downwardly through the furnace roof. The electrodes produce an electric arc between the electrodes and scrap and produce heat, which melts the charge and refines the steel. The EAF has evolved considerably with the use of exothermic reactions to complement the electric arc for scrap melting and steel refining. The exothermic reactions have come in two (2) forms: direct oxygen injection using oxygen lances, and the use of oxy-fuel burners. Each of these energy input systems is more efficient for transferring heat in different parts of the campaign, and each may be controlled to inhibit detrimental interaction between the electrodes, the oxy-fuel burners, and the oxygen lances, as well as to avoid any loss of production or losses of yield efficiency. The molten steel is tapped at about 3,000° F. into a ladle where it may be further refined and cast by ingot casting, continuous casting, or by a thin strip casting process.

Particulate emissions are generated at several points during the steelmaking process. For instance, such emissions are generated during charging of the scrap, during tapping of the furnace, during pneumatic injection of additives, during oxygen blowing, as well as during melt down periods. Customarily in the industry, the EAF dust is collected in baghouses. Because this dust contains heavy metals, the State and Federal environmental regulatory bodies have designated all electric arc dust as hazardous waste. As a result, the disposal of such collected dust presents an ever increasing problem and it has become mandatory to find suitable environmentally accepted methods of dust disposal.

Lime is a recognized costly expense in making steel. During the production of the metallurgical grade dolomitic and hical lime, a significant degree of breakage occurs during calcination. Typically, lime produced in a rotary kiln will include greater than 25% of material sized less than 0.25 inch exiting the kiln. Due to rapid hydration and further breakage during shipping, approximately 25% of lime may arrive at the lime user, such as a steel manufacturer, as a powder. Many of the furnace additive handling schemes described above are inefficient at delivering undersized or powdered materials. Direct losses of undersized material from these material handling systems and losses to the emission control system of the furnace can result in very poor recovery of undersized or powdered materials in the furnace. Undersized material that is lost from the material handling system must be collected and disposed of in an environmentally acceptable fashion. Undersized material that is lost to the furnace emission control system is collected in the bag house. This material is intermingled with heavy metals and must be disposed of as hazardous waste. These losses and waste disposal costs add greatly to the cost of lime and other flux materials containing large amounts of powder or undersized material.

The cost for handling and treating this fine lime waste is significant. The cost of the undersized lime is incurred as part of the original lime delivery that is not utilized in the steelmaking process, and then a second time when the undersized lime is recovered and must be disposed of accordingly. As a result, most steelmakers specify a sizing for the lime that excludes material below a specified sizing limit that is determined by the characteristics of their handling system.

Most handling schemes for introducing flux materials into the steelmaking process are sensitive to the sizing and distribution of material being transported. In most systems, the recovery of undersized material, typically less than about 0.25 inch, is poor. This is due to the fact that lime powder is extremely light-weight, causing it to be lost from transfer points in the steelmaking process and uncontained transport equipment including transfer belts. The fine lime material that escapes the material handling system into the plant facility is also an extreme skin irritant, and is capable of causing mild to moderate skin, eye and respiratory burns.

In order to successfully recycle the fine lime to the furnace, it is generally necessary to bind, agglomerate or encapsulate the fine material in some manner. Direct re-injection of the untreated fine material tends to further pollute the work place. Certain of the prior art processes have attempted to pelletize the fine material in order to enhance its storage and handling characteristics. Although such pellets have been successfully utilized in recycling processes of the type described, they typically involve a chemical bonding or agglomerating reaction which requires a predetermined cure time. Also, the previously known pellets have been difficult to store or have partially disintegrated during transit and reinjection into the furnace.

SUMMARY OF THE INVENTION

The present invention is a method of steelmaking in a steelmaking furnace at substantially reduced costs. The process may start with lime directly from a calcining facility without any processing or sizing to remove limes below less than 0.25 inch, or any other size. The method of making steel in a steelmaking furnace includes charging a steelmaking furnace with an iron source, wherein the iron source is melted and refined in the steelmaking furnace during a campaign, providing a source of lime, wherein the lime is screened by a first screening device, compacting the lime adjacent to the steelmaking furnace to a predetermined size, charging the compacted lime to the steelmaking furnace within a short period of time to avoid degradation of the compacted lime and adding additional fluxing agents and additives to the steelmaking furnace to produce refined steel in the campaign.

Another embodiment of the present invention includes charging a steelmaking furnace with an iron source, wherein the iron source is melted and refined in the steelmaking furnace during a campaign, providing a source of lime, conveying the lime to a first screening device, wherein the screening device separates the lime into a first size and a second size, conveying the lime of the first size to the steelmaking furnace, conveying the lime of the second size to a compacting device, compacting the lime of the second size adjacent to the steelmaking furnace to a predetermined size, charging the compacted lime to the steelmaking furnace within a short period of time after compacting to avoid degradation of the compacted lime and adding additional fluxing agents and additives to the steelmaking furnace to produce refined steel in the campaign.

A further embodiment of the present invention includes charging scrap to the electric arc furnace and melting the scrap in the electric arc furnace during a campaign, providing a source of lime, wherein the lime is screened by a first screening device, compacting the lime adjacent to the electric arc furnace to a predetermined size to form a plurality of compacts; charging the compacted lime into the electric arc furnace and adding additional fluxing agents and additives to the electric arc furnace to produce refined molten steel in the campaign.

The lime compacts may be produced without binder. The method may avoid completely the cost of binder in compacting which is normal practice in making compacted lime and other additives for steelmaking at a lime-producing facility. The briquette size of the lime briquettes may be controlled to a desired size range between one-fourth inch and four inches. The compacted lime material is selected from the group consisting of calcined high calcium lime and limestone or the group consisting of calcined dolomitic lime and dolomitic limestone.

In any case, with the present invention, the cost of making steel is substantially reduced because of the form and method of lime addition to the steelmaking furnace. The compacted lime as above described may be added to the steelmaking furnace by fluidized delivery, by bulk additions or by mechanical conveyor.

A further embodiment of the present invention includes compacting at least one additional material adjacent to the steelmaking furnace to a predetermined size. The at least one material is selected from the group consisting of a fluxing agent and an additive, and adding the compacted material to the steelmaking furnace during the campaign to produce refined molten steel within a predetermined time period in order to avoid degradation of the compacted material.

These compacted additives and fluxing agents may be calcium aluminate, bauxite, feldspar, or a metal additive such as silicon manganese, iron oxide or metallic iron., burnt magnesite, raw magnesite or a combination of MgO bearing materials, coal or some other carbonaceous material. The compacted additive or fluxing agent may also be a mixture in combination of one or more of these materials.

The advantages and novel features of the present invention, as well as details of the illustrated embodiments thereof, will be more fully understood from the following description and drawings.

BRIEF DESCRIPTION OF THE DRAWINGS

In order that the invention may be more fully explained, an illustrative embodiment will be described in some detail with reference to the accompanying drawings in which.

DETAILED DESCRIPTION OF THE INVENTION

The present invention is directed towards a method of making steel. The basic steelmaking process comprises a known series of steps in the transformation of scrap and/or pig iron into steel. Various furnaces are available for this purpose, including the electric arc furnace, the basic oxygen furnace (top blown, bottom blown, top and bottom blown), and the open hearth furnace. While choice of the specific furnace to be used and specific procedure to be followed varies based on criteria known to those skilled in the steelmaking art, depending upon the composition, purity and end-use of the steel desired, certain difficulties in steel production are common across the procedures. In the present invention, an electric arc furnace is used to prepare the final steel product in particular, but other types of furnaces may be used.

Figure 1:
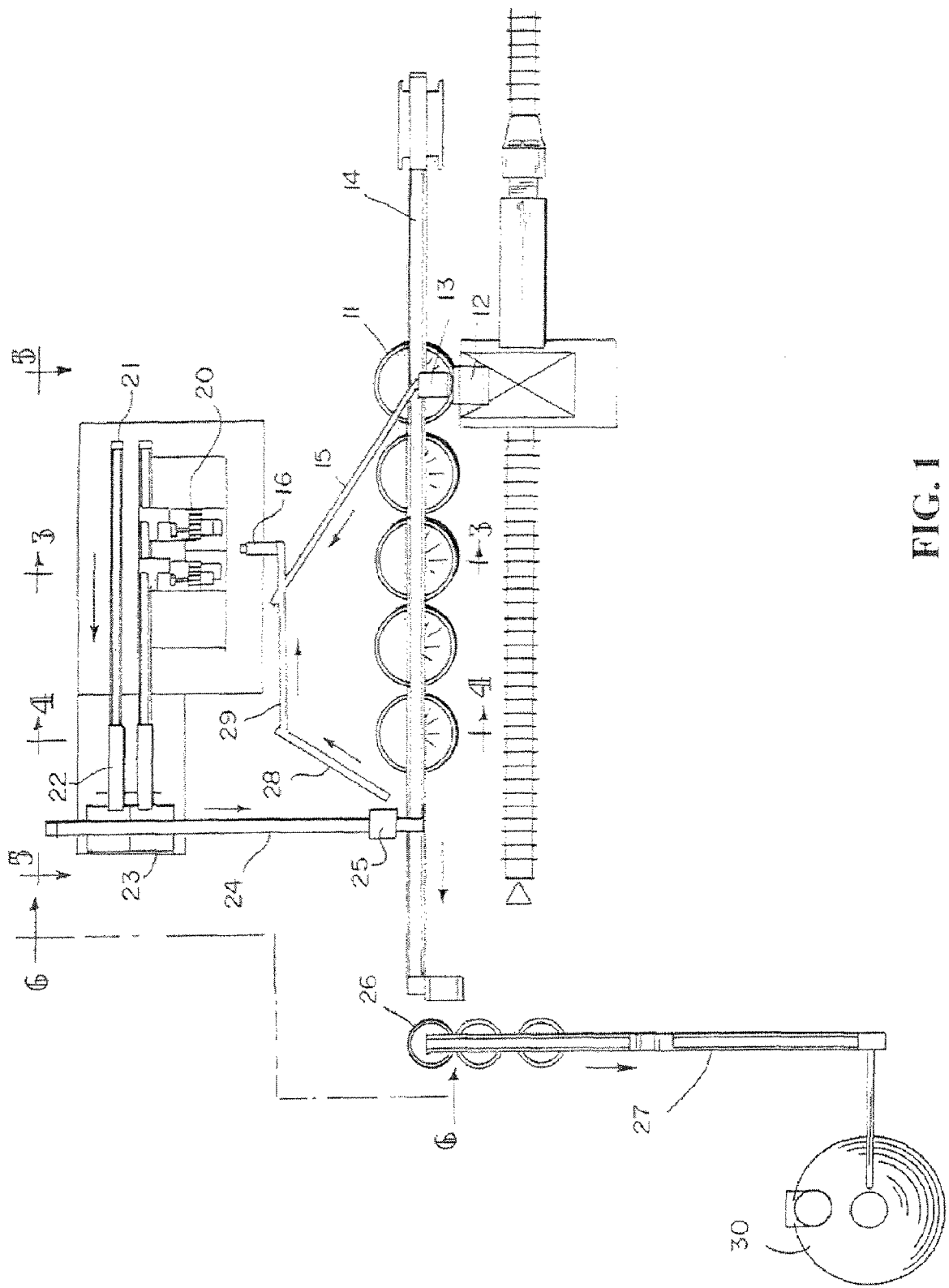
FIG. 1 is a plan view of a schematic diagram of a processing and handling of flux materials and additives for performing the method of the invention.

FIG. 1 is an exemplary illustration of a first embodiment a steelmaking process 10 in accordance with various aspects of the present invention. A source of lime, including Hical lime, dolomitic lime, limestone, and calcined lime, as well as other flux materials, is delivered to the steelmaking facility by truck, or railway car. Typically, lime shipped from a lime producer site is free of a binder and/or a lubricant. Further, the fine size lime is usually a waste and the lime supplier can be included in the shipment. However, the lime producer may employ the use of a binder and/or lubricant in compacting fine lime material in order to ensure the structural integrity of the compacted material during shipment to a customer site. It is known to one skilled in the art that lime in such form readily hydrates in the air and is susceptible to degradation to a powder over the course of a 12 to 24 hour period. It will be understood by those skilled in the art that the lime may take various forms, depending in particular of use of the invention. The material may be stored in a silo 11 until it is ready for use or used immediately in steelmaking.

Figure 2:
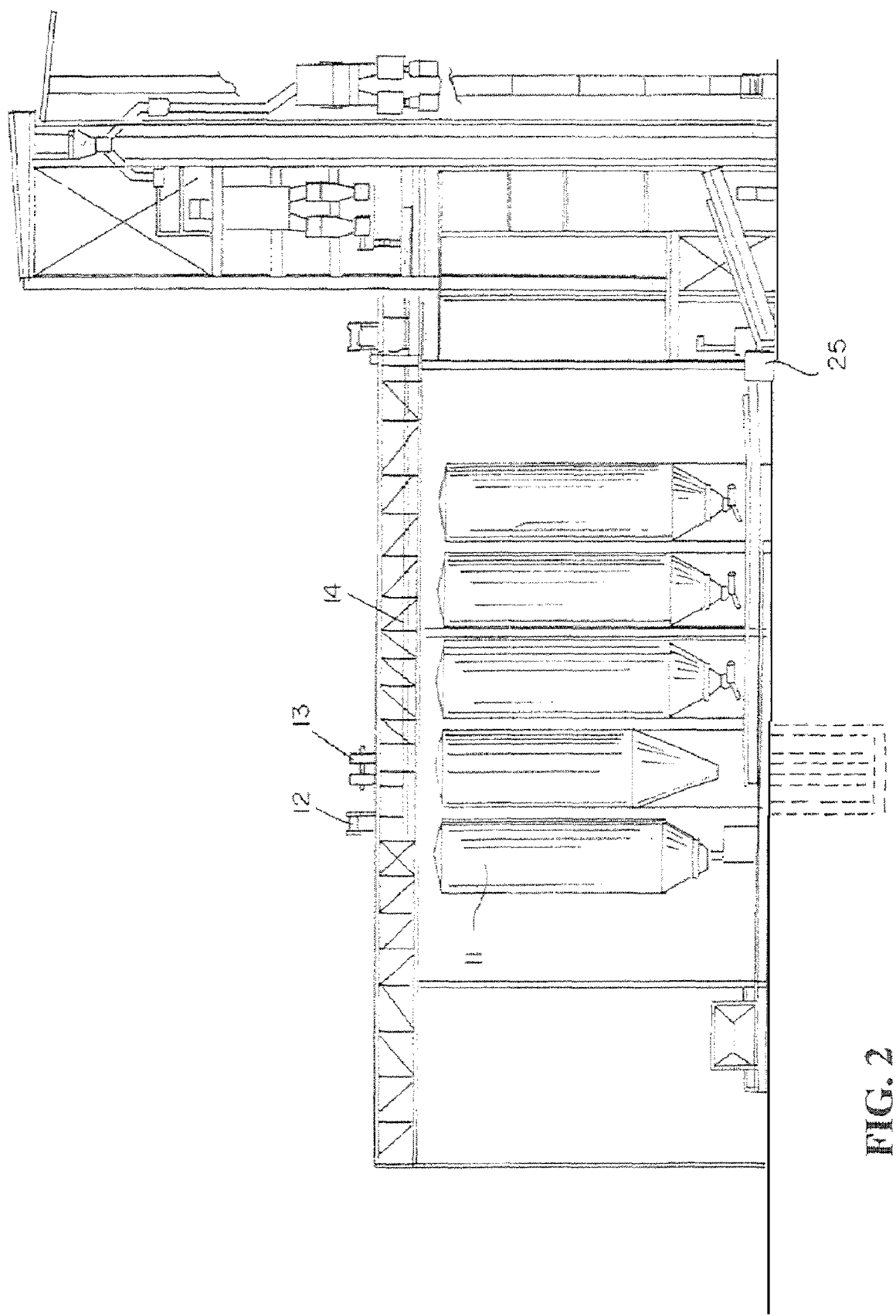
FIG. 2 is a rear perspective view of a portion of the schematic diagram of FIG. 1.

In the practice of the invention, as seen in FIG. 2, lime delivered to the steelmaking facility is conveyed through a conveyance device 12, such as a bucket elevator, and deposited and stored within an available silo 11. Optionally, a first screening device 13, such as a vibratory screener, is positioned adjacent to conveyance device 12 such that the lime is screened prior to storage in silo 11. Screening device 13 provides inline screening of the lime material in order to separate the material that is greater than about 0.25 inch and less than about 0.25 inch. The material that is greater than about 0.25 inch is conveyed as indicated by conveyor 14, stored in EAF surge bins 26 and ultimately is delivered, as indicated at 27, to the steelmaking furnace, such as EAF 30. The fine lime material having a size that is less than about 0.25 inch passes through screening device 13 and is deposited in silo 11.

Figure 3:
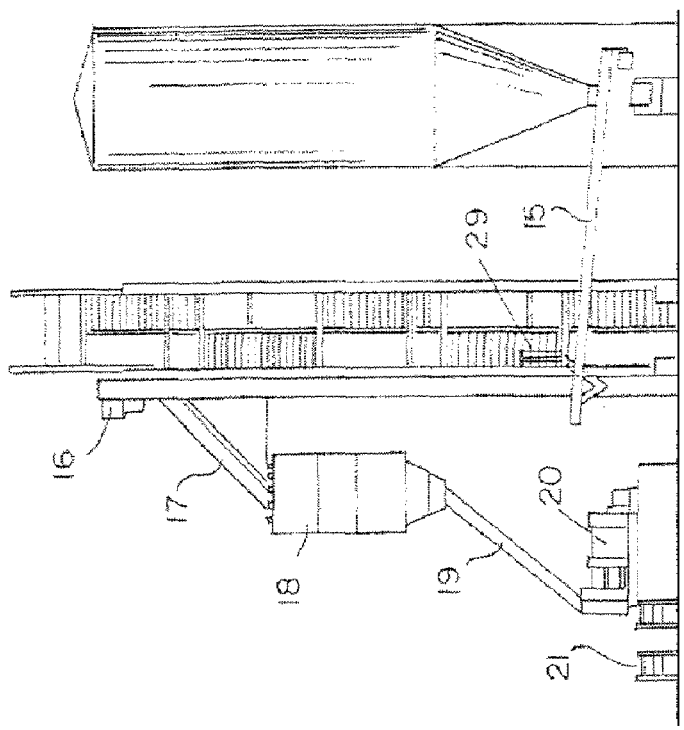
FIG. 3 is a side elevation view of a portion across lines 3-3 of the schematic diagram of FIG. 1.
Figure 4:
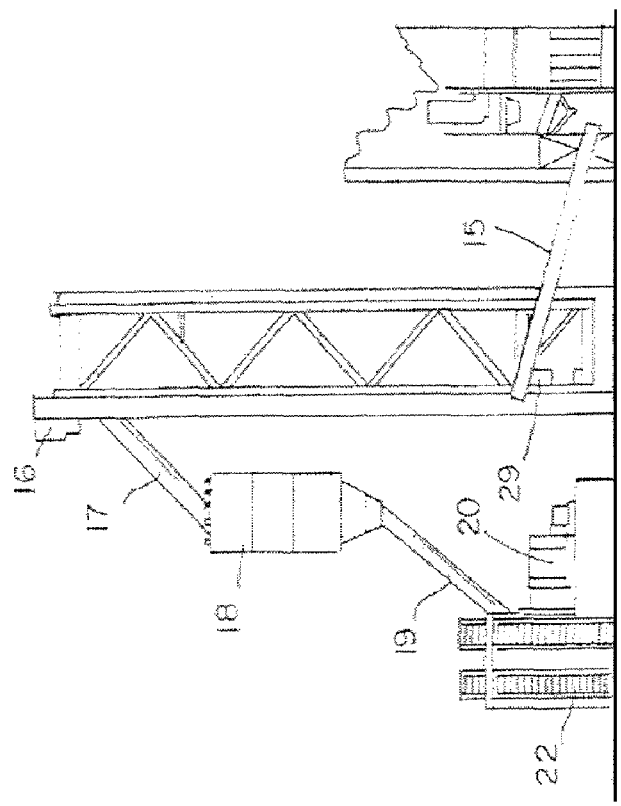
FIG. 4 is a side elevation view of a portion across lines 4-4 of the schematic diagram of FIG. 1.

As seen in FIGS. 1, 3 and 4, the fine size lime material is discharged from silo 11 onto conveyance device 15, such as screw feeder. The material having a size less than about 0.25 inch is discharged from conveyance device 15 onto another conveyance device 16, a bucket elevator for example. From conveyance device 16, the fine size lime material travels down as indicated at 17 to holding bin 18. From holding bin 18, the fine lime material passes as indicated at 19 from holding bin 18 to compacting machine 20. This high pressure compacting machine, also referred to as a briquetting machine, converts the small sized material to briquettes or compacts. In one embodiment, these compacts are sized to be greater than 0.25 inch and do not require the use of a binder or sealant to form the compacts. However, during the processing of the small material, a binder and/or a sealant may be used if desired, but as known to one skilled in the art, the use of these materials may add to the steelmaking process costs. The precise compacting conditions to be employed will vary in accordance with the characteristics of the particular lime or other flux material and additives being processed, and it is within the skill of an operator of compacting equipment to make any necessary adjustments in the process parameters to obtain satisfactory compacts.

Figures 5, 6:
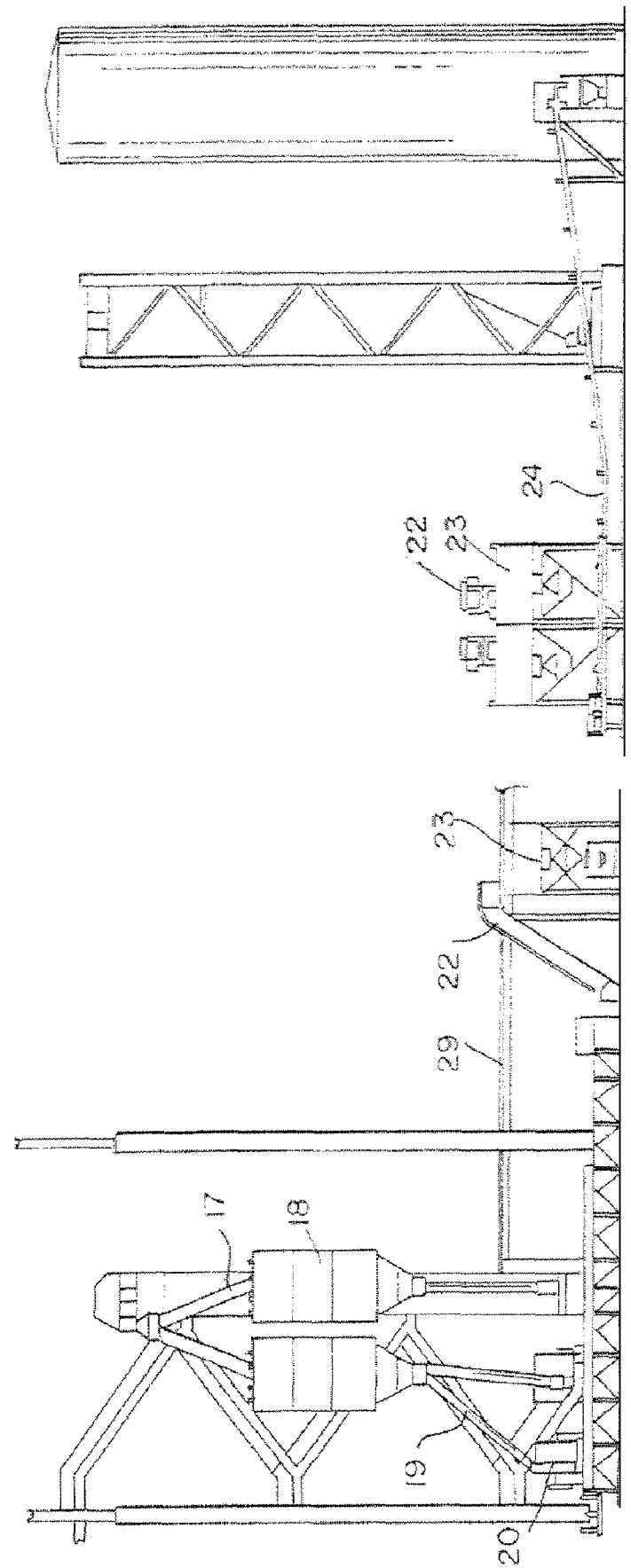
FIG. 5 is a side elevation view of a portion across lines 5-5 of the schematic diagram of FIG. 1.
FIG. 6 is a side elevation view of a portion across lines 6-6 of the schematic diagram of FIG. 1.

As seen in FIGS. 3-5, after being made, the compacts are passed as indicated at 21 to conveyance device 22. From conveyance device 22, the compacts are deposited into storage bin 23. Desirably, storage bin 23 is of approximately such capacity as to contain enough compact material to operate the process vessel for a period of time on the order of 0.5 to 24 hours. The compacted material is then delivered to the steelmaking furnace either in parallel to the material that is greater than 0.25 inch or by recombination of the compacted material with the material that is greater than 0.25 inch. In the example of FIG. 1, the compacted material is combined on conveyor 14 by conveyor 24 with the material that is greater than about 0.25 inch and is conveyed as indicated by conveyor 14, stored in EAF surge bins 26. The combined material ultimately is delivered, as indicated at 27, to the steelmaking furnace, such as EAF 30 Owing to the nature of binderless compacted fines of lime material in that they tend to absorb moisture from the air and swell and can become degraded, it is important to plan upon using such compacts rather promptly after they are produced, preferably within less than 24 hours and nearly always within less than 48 hours. With such fines, it is ordinarily not economical either to provide the storage container with a controlled moisture-free atmosphere or to coat the compacts with material for making the compacts moisture-resistant, especially since merely by the prompt use of the compact these measures adding to the cost of the process can be avoided.

As seen in FIGS. 1 and 2, second screening device 25 provides inline screening of the compacts. This inline screening separates the compacts having a size greater than about 0.25 inch from those that have broken and/or deteriorated thus resulting in a size of less than about 0.25 inch. Those compacts that meet the 0.25 inch size requirement are conveyed to conveyor 14, stored in EAF surge bins 26 and ultimately is delivered to the steelmaking furnace, such as EAF 31, to be used in the campaign of the steelmaking process. The compacts having a size less than about 0.25 inch pass through second screening device 25 and are conveyed on conveyance devices 28 and 29 until it reaches conveyance device 16 as seen in FIGS. 1 and 3-5. From conveyance device 16, the fine size lime material travels down as indicated at 17 to holding bin 18. From holding bin 18, the fine lime material passes as indicated at 19 from holding bin 18 to compacting machine 20. Once the fine lime material is compacted, it is treated as previously described.

Those skilled in the art will recognize that the practices may be modified in various ways to include other fluxing agents or additives are being handled. The term flux is used to designate material that is added to the contents of a furnace for the purpose of purging the metal of impurities, and controlling the physical and chemical properties of the slag, i.e. melting point, chemical make up, viscosity, oxygen ion activity, etc. The flux most commonly used in steel furnaces is lime. These fluxing agents and additives can be introduced into the furnace during the steelmaking process to promote the solubilizing of fluxing materials, desulfurization, and removal of undesired inclusions from the steel composition. These materials, used either alone or in combination with others, include, lime, bauxite, calcium aluminate, dolomitic lime ($CaO$—$MgO$), feldspar, silicon manganese, calcined high calcium lime, limestone, calcined dolomitic lime, and calcined dolomitic limestone, burnt magnesite, raw magnesite, and a combination of magnesium oxide bearing materials.

The feeding of compacted material having a size greater than about 0.25 inch to the EAF may be done either directly or indirectly, the latter being more usual. In other words, the means 18 may include usual means not shown, for directing lime materials and other fluxing agents and additives into the processing vessel, such as an EAF, including bins for the relatively short-term storage of the material and further weighing means for measuring out specific predetermined weights of material to be charged to the vessel. It is important to maintain the total interval of time between completion of compacting and charging to the steel furnace suitably short, in order that the compacts may be fed to the vessel before they have undergone substantial absorption of moisture and degradation. This usually means that such interval of time should be less than 2 days and preferably less than 24 hours.

Figure 8:
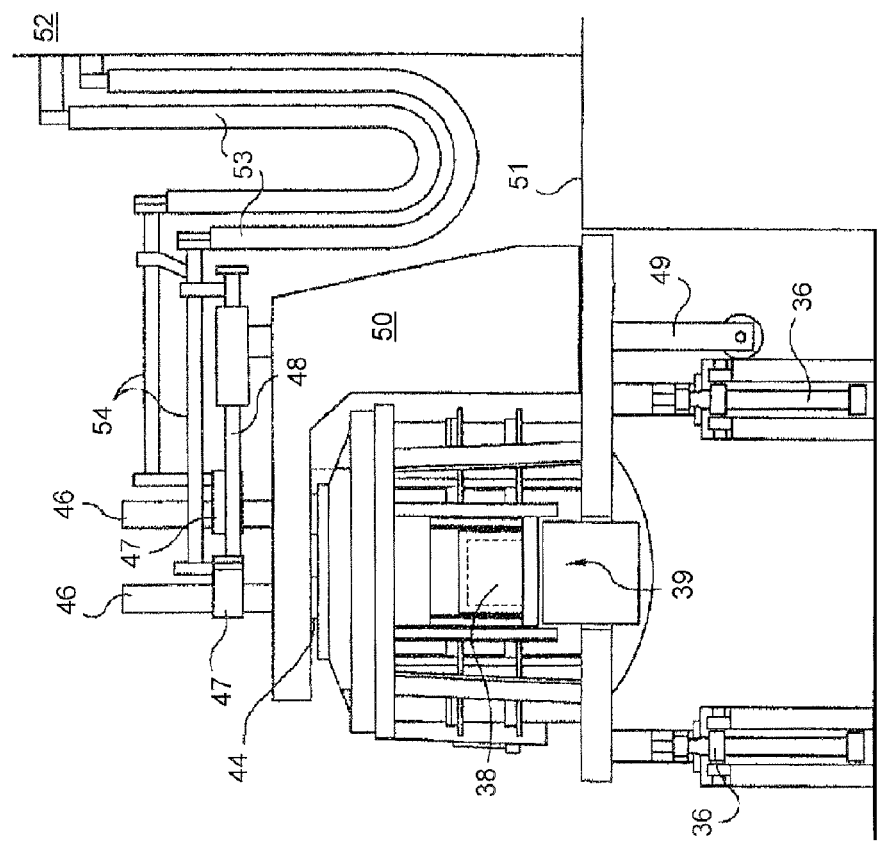
FIG. 8 is a back view of an electric arc furnace used in performing the method of the invention.
Figure 7:
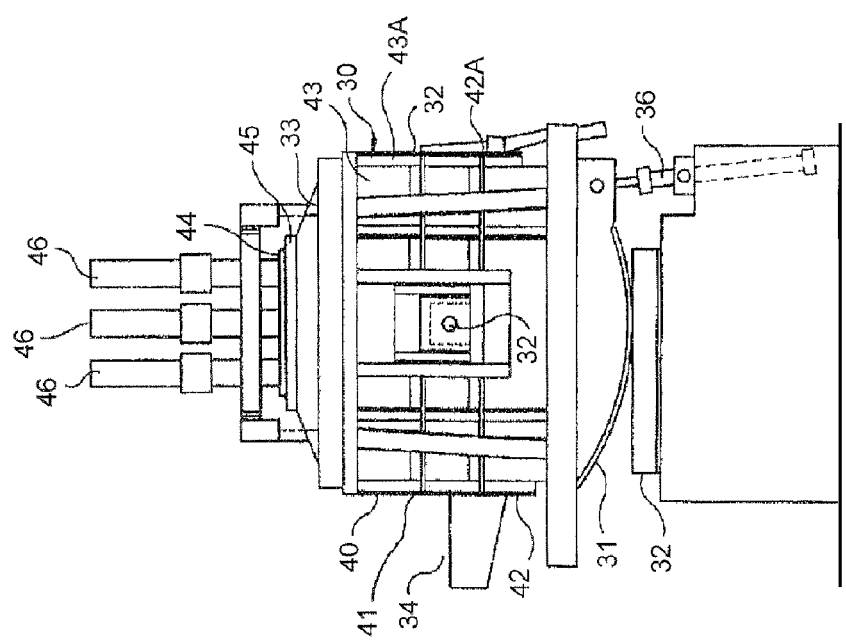
FIG. 7 is a side elevation view of an electric arc furnace used in performing the method of the invention.

In the present invention, EAF 31, as seen in FIGS. 7 and 8, is generally cylindrical in shape, and has a generally spherical shaped bottom 31, sidewalls 32 and a roof 33. Although described above with reference to an AC EAF furnace, the invention may also be used with a DC EAF furnace. In either case, the bottom 31 is refractory lined, and the sidewalls 32 are generally refractory lined to above the slag line. The EAF also has a spout 34. The EAF rests on a rocker rail 35, and is capable of being tilted by hydraulic cylinders 36 to discharge the molten metal from the furnace through spout 34.

Also, provided in sidewall 32 is slide door 37 for charging and a backdoor 38 with a slag apron 39 for discharge of the slag from the furnace. The electric arc furnace 30 may have a split shell with a top portion 41 capable of being quickly decoupled and removed from a bottom portion 42. This facilitates and minimizes downtime due to change out of the top portion 41 of the furnace, and provides for rapid relining of the bottom portion 42 of the furnace. A sill line 42A divides the upper portion 41 from the bottom portion 42 of the electric arc furnace The sidewalls 32 above the slag line usually are comprised of water-cooled panels 43 supported by a water-cooled cage 43A. The furnace roof 33 is also comprised of water-cooled panels with the center section of roof 33, surrounding the electrode ports 44 (called the roof delta 45) generally a cast section of refractory, which may be also water cooled. Electrodes 46 extend through the electrode ports 44 into the furnace. Electrodes 46 are supported by electrode holders 47, electrode mast arms 48 and electrode mast 49. Root 33 of the furnace may be removed and supported by jib structure 50 which may be supported by the operating floor level structure 51.

The transformers (not shown), housed in an electrical equipment vault 52, supply the electrical current to the electrodes 46 and the steel melt in the electric arc furnace. Secondary power cables 53 supply the electric power from the transformers to bus tubes 54. Also housed in the electrical equipment vault may be a regulator (not shown) that measures, directly or indirectly, the electrical current in at least two of the three phases of electric power supplied to the electrodes in the electric arc furnace. It is understood that this description of these embodiments of the present invention are intended for illustrative purposes only. The invention may be otherwise embodied in other forms within the scope of the following claims that will be apparent to those skilled in the art and such other embodiments are desired to be protected.

What is claimed is:

1. A method of making steel in a steelmaking furnace, the method comprising the steps of:
    charging a steelmaking furnace with an iron source, wherein the iron source is melted and refined in the steelmaking furnace during a campaign;
    providing a source of uncompacted lime, wherein the lime is screened by a first screening device;
    compacting the lime adjacent to the steelmaking furnace to a predetermined size;
    charging the compacted lime to the steelmaking furnace within a short period of time to avoid degradation of the compacted lime; and
    adding additional fluxing agents and additives to the steelmaking furnace to produce refined steel in the campaign.

2. The method of claim 1, wherein the predetermined size of the lime is at least about 0.25 inch.

3. The method of claim 1, wherein the compacted material is in the form of a plurality of compacts.

4. The method of claim 3, wherein the compacts are prepared without the use of a binder.

5. The method of claim 3, wherein the compacts are prepared without the use of a lubricant.

6. The method of claim 1 further comprising the steps of:
    compacting at least one additional material adjacent to the steelmaking furnace to a predetermined size, wherein the at least one material is selected from the group consisting of a fluxing agent and an additive; and
    adding the compacted material to the steelmaking furnace during the campaign to produce refined molten steel within a predetermined time period in order to avoid degradation of the compacted fluxing agent.

7. The method of claim 6, wherein the compacted material is produced without a binder.

8. The method of claim 6, wherein the compacted material is produced without a lubricant.

9. The method of claim 6, wherein compacted material is calcium aluminate.

10. The method of claim 6, wherein compacted material is bauxite.

11. The method of claim 6, wherein compacted material is feldspar.

12. The method of claim 6, wherein compacted material is silicon manganese.

13. The method of claim 6, wherein the compacted material is selected from the group consisting of calcined high calcium lime and limestone.

14. The method of claim 6, wherein the compacted material is selected from the group consisting of calcined dolomitic lime and dolomitic limestone.

15. The method of claim 6, wherein the compacted material is selected from the group consisting of burnt magnesite, raw magnesite and a combination of magnesium oxide bearing materials.

16. The method of claim 6, wherein the compacted material is selected from the group consisting of coal and other carbonaceous material.

17. The method of claim 6, wherein the compacted material is selected from the group consisting of iron oxide and metallic iron.

18. The method of claim 1 further comprising the steps of:
    screening the compacted lime with a second screening device prior to charging the compacted lime to the steelmaking furnace.

19. A method of making steel in a steelmaking furnace, the method comprising the steps of:
    charging a steelmaking furnace with an iron source, wherein the iron source is melted and refined in the steelmaking furnace during a campaign;
    providing a source of uncompacted lime;
    conveying the lime to a first screening device, wherein the screening device separates the lime into a first size and a second size;
    conveying the lime of the first size to the steelmaking furnace;
    conveying the lime of the second size to a compacting device;
    compacting the lime of the second size adjacent to the steelmaking furnace to a predetermined size;
    charging the compacted lime to the steelmaking furnace within a short period of time after compacting to avoid degradation of the compacted lime; and
    adding additional fluxing agents and additives to the steelmaking furnace to produce refined steel in the campaign.

20. The method of claim 19 further comprising the steps of:
    screening the compacted lime with a second screening device prior to charging the compacted lime to the steelmaking furnace.

21. A method of making steel in an electric arc furnace, the method comprising the steps of:
    charging scrap to the electric arc furnace and melting the scrap in the electric arc furnace during a campaign;
    providing a source of uncompacted lime, wherein the lime is screened by a first screening device;
    compacting the lime adjacent to the electric arc furnace to a predetermined size to form a plurality of compacts;
    charging the compacted lime into the electric arc furnace; and
    adding additional fluxing agents and additives to the electric arc furnace to produce refined molten steel in the campaign.

22. The method of claim 21, wherein the compact size is produced within the range from about 0.25 inch to about 4 inches.

23. The method of claim 22, wherein the size of each compact is about 0.25 inch.

24. The method of claim 21, wherein the compacts are produced without a binder and a lubricant.

25. The method of claim 21, further comprising:
    compacting at least one additional fluxing agent and additive located adjacent to the electric arc furnace to a size of at least about 0.25 inch.

26. The method of claim 21 further comprising the steps of:
    screening the compacted lime with a second screening device prior to charging the compacted lime to the steelmaking furnace.

* * * * *